(12) United States Patent
DeWhitt

(10) Patent No.: US 8,193,403 B2
(45) Date of Patent: *Jun. 5, 2012

(54) SYSTEMS AND METHODS FOR RECYCLING PLASTIC

(75) Inventor: Kevin Clark DeWhitt, Longview, WA (US)

(73) Assignee: Agilyx Corporation, Tigard, OR (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/825,086

(22) Filed: Jun. 28, 2010

(65) Prior Publication Data

US 2010/0320070 A1  Dec. 23, 2010

Related U.S. Application Data

(63) Continuation-in-part of application No. 11/510,489, filed on Aug. 24, 2006, now Pat. No. 7,758,729, and a continuation-in-part of application No. 12/751,911, filed on Mar. 31, 2010.

(60) Provisional application No. 61/352,793, filed on Jun. 8, 2010.

(51) Int. Cl.
*C07C 1/00* (2006.01)
*C10B 57/04* (2006.01)

(52) U.S. Cl. .......... 585/241; 201/25; 202/131; 202/136; 202/137; 202/216; 202/226

(58) Field of Classification Search ............ 201/25; 585/241; 202/87, 96, 131, 136, 137, 216, 202/226

See application file for complete search history.

(56) References Cited

U.S. PATENT DOCUMENTS

| | | | |
|---|---|---|---|
| 3,810,563 A | 5/1974 | La Mers | |
| 4,164,484 A | 8/1979 | Tokuda | |
| 4,168,942 A | 9/1979 | Firth | |
| 4,220,480 A * | 9/1980 | Dwan | 134/5 |
| 4,454,084 A | 6/1984 | Smith et al. | |
| 5,240,656 A | 8/1993 | Scheeres | |
| 5,269,947 A | 12/1993 | Baskis | |
| 5,321,174 A | 6/1994 | Evans | |
| 5,342,421 A | 8/1994 | Breu | |
| 5,359,061 A | 10/1994 | Evans | |

(Continued)

FOREIGN PATENT DOCUMENTS

GB  2231057 A  11/1990

(Continued)

OTHER PUBLICATIONS

Heynderickx, et al., "A Shell and Tube Pyrolysis Reactor for Olefin Production" Ind. Eng. Chem. Res. 1992, vol. 31, 2080-2087.

(Continued)

*Primary Examiner* — Nina Bhat
(74) *Attorney, Agent, or Firm* — Stoel Rives LLP; Samuel E. Webb

(57) ABSTRACT

Systems and methods for recycling waste plastic can convert the waste plastic into a form of purified crude oil that includes one or more organic molecular species and that is free, or substantially free, of impurities such as acids and metals. In some systems and methods, the plastic is heated under vacuum conditions to effect depolymerization of the plastic, which yields a vapor, and the vapor is then directly contacted with a pH adjusted solution in a vapor treatment system. In some systems and methods, a continuous batch process is employed.

41 Claims, 9 Drawing Sheets

U.S. PATENT DOCUMENTS

| | | | |
|---|---|---|---|
| 5,360,553 | A | 11/1994 | Baskis |
| 5,427,650 | A | 6/1995 | Holloway |
| 5,481,052 | A | 1/1996 | Hardman |
| 5,608,136 | A * | 3/1997 | Maezawa et al. ............. 588/316 |
| 5,623,863 | A | 4/1997 | Plantan |
| 5,666,878 | A | 9/1997 | Taricco |
| 5,731,483 | A | 3/1998 | Stabel |
| 5,744,668 | A | 4/1998 | Zhou |
| 5,780,696 | A | 7/1998 | Bauer |
| 5,811,606 | A | 9/1998 | Yang |
| 5,820,736 | A | 10/1998 | Bouziane et al. |
| 5,821,396 | A | 10/1998 | Bouziane |
| 5,824,193 | A | 10/1998 | Edwards |
| 5,824,709 | A | 10/1998 | Suka |
| 5,836,524 | A | 11/1998 | Wang |
| 5,849,964 | A | 12/1998 | Holighaus |
| 5,973,217 | A | 10/1999 | Hastrich |
| 6,011,187 | A | 1/2000 | Horizoe |
| 6,046,370 | A * | 4/2000 | Affolter et al. ............... 585/241 |
| 6,150,577 | A | 11/2000 | Miller et al. |
| 6,172,271 | B1 | 1/2001 | Horizoe |
| 6,190,542 | B1 | 2/2001 | Comolli |
| 6,288,296 | B1 | 9/2001 | Miller |
| 6,534,689 | B1 | 3/2003 | Stankevitch |
| 6,861,568 | B1 | 3/2005 | Guffey et al. |
| 7,626,062 | B2 * | 12/2009 | Carner ......................... 585/241 |
| 7,758,729 | B1 * | 7/2010 | DeWhitt ........................ 202/87 |
| 7,892,500 | B2 * | 2/2011 | Carner ....................... 422/184.1 |
| 2002/0070104 | A1 * | 6/2002 | Nichols ............................. 201/1 |
| 2002/0072640 | A1 | 6/2002 | Nichols |
| 2002/0156332 | A1 | 10/2002 | Jiang |
| 2003/0047437 | A1 | 3/2003 | Stankevitch |
| 2003/0050519 | A1 | 3/2003 | Cheng |
| 2004/0050678 | A1 | 3/2004 | Takahashi et al. |
| 2005/0132883 | A1 | 6/2005 | Su et al. |
| 2009/0062581 | A1 | 3/2009 | Appel et al. |
| 2010/0305372 | A1 | 12/2010 | DeWhitt |
| 2011/0239541 | A1 | 10/2011 | Garrison et al. |
| 2012/0024686 | A1 | 2/2012 | DeWhitt |
| 2012/0034571 | A1 | 2/2012 | Garrison et al. |

FOREIGN PATENT DOCUMENTS

| | | |
|---|---|---|
| WO | WO 2011/123145 | 10/2011 |
| WO | WO 2011/123272 | 10/2011 |

OTHER PUBLICATIONS

Office Action issued Dec. 19, 2008 in corresponding U.S. Appl. No. 11/510,489, now U.S. Patent No. 7,758,729.

Response to Dec. 19, 2008 Office Action filed Mar. 24, 2008 in corresponding U.S. Appl. No. 11/510,489, now U.S. Patent No. 7,758,729.

Office Action issued Jun. 23, 2009 in corresponding U.S. Appl. No. 11/510,489, now U.S. Patent No. 7,758,729.

Response to Jun. 23, 2009 Office Action filed Oct. 23, 2009 in corresponding U.S. Appl. No. 11/510,489, now U.S. Patent No. 7,758,729.

Office Action issued Dec. 8, 2009 in corresponding U.S. Appl. No. 11/510,489, now U.S. Patent No. 7,758,729.

Response to Dec. 8, 2009 Office Action filed Feb. 26, 2010 in corresponding U.S. Appl. No. 11/510,489, now U.S. Patent No. 7,758,729.

Notice of Allowance and Fees Due issued Mar. 8, 2010 in corresponding U.S. Appl. No. 11/510,489, now U.S. Patent No. 7,758,729.

Preliminary Amendment filed on Jun. 11, 2010 in corresponding U.S. Appl. No. 12/814,391.

Preliminary Amendment filed on Oct. 14, 2011 in corresponding U.S. Appl. No. 12/814,391.

Office Action issued Dec. 19, 2011 in U.S. Appl. No. 12/814,391.

Preliminary Amendment filed on Mar. 3, 2011 in corresponding U.S. Appl. No. 12/751,911.

Office Action issued on Dec. 15, 2011 in corresponding U.S. Appl. No. 12/751,911.

Notification of the International Search Report and the Written Opinion of the International Searching Authority issued May 5, 2011 in International Application No. PCT/US2011/029129, now WO 2011/123272.

Notification of the International Search Report and the Written Opinion of the International Searching Authority issued Apr. 28, 2011 in International Application No. PCT/US2010/040219, now WO 2011/123145.

Interview Summary issued Jan. 23, 2012 in corresponding U.S. Appl. No. 12/751,911.

Office Action issued Dec. 13, 2011 in U.S. Appl. No. 13/273,097.

Interview Summary issued Jan. 20, 2012 in corresponding U.S. Appl. No. 13/273,097.

Office Action issued Dec. 16, 2011 in U.S. Appl. No. 13/273,089.

Interview Summary issued Jan. 20, 2012 in corresponding U.S. Appl. No. 13/273,089.

* cited by examiner

SYSTEMS AND METHODS FOR RECYCLING PLASTIC

CROSS-REFERENCE TO RELATED APPLICATIONS

This application is a continuation-in-part of prior U.S. patent application Ser. No. 11/510,489, filed Aug. 24, 2006, titled SYSTEM AND METHOD OF RECYCLING PLASTICS now U.S. Pat. No. 7,758,729; this application is a continuation-in-part of prior U.S. patent application Ser. No. 12/751,911, filed Mar. 31, 2010, titled DEVICES, SYSTEMS, AND METHODS FOR RECYCLING PLASTIC now allowed; and this application claims the benefit of U.S. Provisional Application No. 61/352,793, filed Jun. 8, 2010, titled SYSTEMS AND METHODS FOR RECYCLING PLASTIC. The entire contents of each of the foregoing applications are hereby incorporated by reference herein.

TECHNICAL FIELD

The present disclosure relates generally to the recycling of plastic. Certain embodiments relate more specifically to systems and methods for vaporizing plastic and recovering organic molecules from the resultant vapor.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Certain embodiments of systems and methods described herein are configured for efficient recycling of plastic. Some systems and methods can quickly and simply convert waste plastics into one or more purified organic molecular species, which can be considered as a crude hydrocarbon material or crude oil. The crude oil may be readily stored, transported, and/or refined into fuel or other commercially relevant materials.

In some embodiments, a quantity of waste plastic feedstock can be introduced into a sealable cartridge or container. The container can be heated under vacuum conditions such that the plastic feedstock transitions into a vapor (e.g., one or more gases), which can be removed from the cartridge for further processing. For example, the vapor can be introduced into a condenser and directly contacted with a pH adjusted solution, which can, in some instances, absorb a portion of the vapor and condense another portion thereof. The condensed material can comprise one or more organic molecular species that can be termed herein as a crude oil. The crude oil can be separated from the other portions of the vapor that are absorbed into the pH adjusted solution, and thus the crude oil can be of a clean or purified quality such that it may be readily refined from its crude state.

Various illustrative embodiments of inventive systems and methods will now be described. Advantages of the systems and methods, as well as features and steps thereof, respectively, will be apparent from the disclosure that follows.

Figure 1:
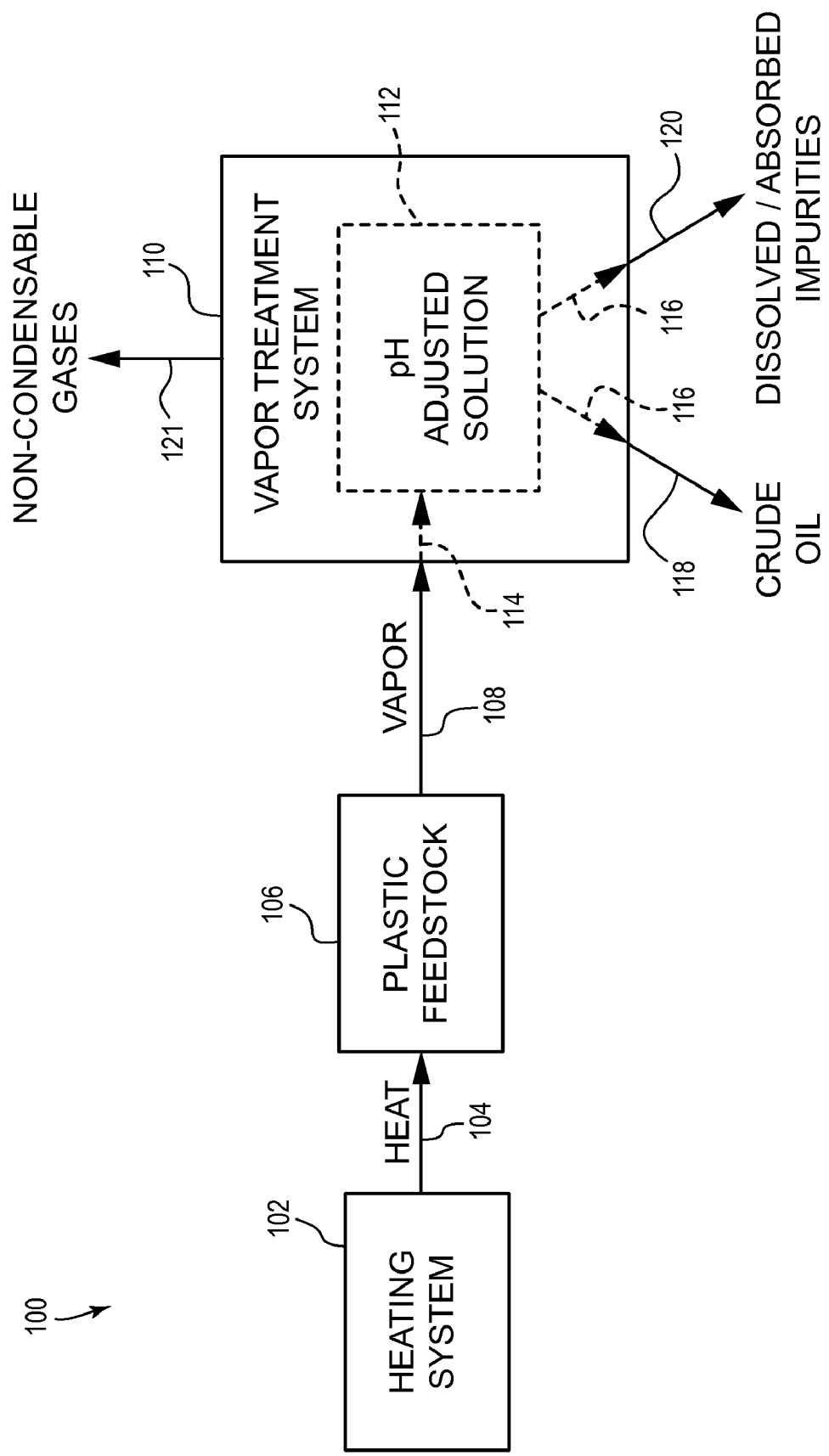
FIG. 1 is a schematic flow diagram of an embodiment of a plastic recycling system.

FIG. 1 depicts a process flow diagram of an embodiment of a plastic recycling system 100. The plastic recycling system 100 includes a heating system 102 that is configured to deliver heat 104 to a plastic feedstock 106. The heating system 102 can comprise any suitable heating mechanism, such as, for example, a combustion burner, a fluidized bed burner, a retort, or any other such heating system. In some applications, the heating system 102 operates at a high and steady temperature.

The plastic feedstock 106 can comprise waste plastics of one or more varieties (e.g., mixed plastics), and may include trace amounts of non-plastic contamination or impurities. For example, the impurities may be of an external nature (e.g., water, foodstuffs, labeling, soil, paper, or cellulose waste) or may result from internal amendments (e.g., glass, metal, iron, bromine, and/or chlorine). The plastic feedstock 106 may be provided in a ground, chipped, or other form that can promote the transfer of heat thereto.

The heat 104 provided by the heating system 102 can be sufficient to crack or depolymerize the plastic feedstock 106 and convert at least a portion thereof into a vapor 108. The vapor 108 can include one or more gaseous organic species, one or more gaseous inorganic species, and/or one or more varieties of entrained particles. In particular, the vapor 108 can include depolymerized non-polar organic gases, which may be desirable for collection and refinement, and which can be mixed with impurities. The organic gases can include, for example, one or more paraffins, olefins, naphthenes, aromatics, and/or other classes of hydrocarbon materials. The mixed-in impurities can include, for example, inorganic acids (e.g., hydrochloric acid, hydrobromic acid), entrained metals or metalloids (e.g., cadmium, iron, antimony); and/or organic acids (e.g., terephthalic acid). In some embodiments, the vapor 108 may include additional molecular species, such as polar organic molecules, which may or may not be collected with the non-polar organic molecules. For example, the vapor 108 can include one or more alcohols, ketones, ethers, phenols, carboxylic acids, or other polar organic molecules.

In some embodiments, the plastic feedstock 106 may be heated under vacuum conditions, or under negative pressure. In other embodiments, the plastic feedstock 106 may be heated under positive pressure. In still other or further embodiments, the plastic feedstock 106 may be heated under atmospheric pressure conditions, or under any suitable combination of the foregoing (e.g., the pressure may be varied during a heating event).

The vapor 108 can be delivered to a vapor treatment system 110 that effects a phase change of at least a portion of the vapor 108 such that certain molecules transition from a gaseous state to a liquid state. The vapor treatment system 110 may also be referred to as a vapor treatment unit or a vapor treatment vessel. The illustrated vapor treatment system 110 includes a pH adjusted solution 112 that is used to effect the condensation. Moreover, the pH adjusted solution 112 can be configured to absorb at least a portion of the impurities from the vapor 108. Embodiments of the solution 112 can readily absorb organic acids, inorganic acids, metals, metalloids, and/or certain polar organic molecules. The term "pH adjusted solution" is used in a broad sense and includes solutions that are not pH neutral and that exhibit any or all of the various properties described herein. For example, a pH adjusted solution can be formulated to remove impurities from the vapor 108, and in further embodiments, can be immiscible with condensed oils so as to be readily separated therefrom. For example, in some embodiments, the pH adjusted solution 112 can comprise an acidic solution, which may, in some cases, be strongly acidic. In further embodiments, the pH adjusted solution 112 can comprise a buffered aqueous solution adjusted to a desired pH value. In various embodiment, the pH adjusted solution 112 can have a pH value that is less than 7, less than about 6.5, less than about 6, less than about 5.5, less than about 5, less than about 4, or less than about 3.

The pH adjusted solution 112 can include one or more chemical amendments of any suitable variety to achieve the desired properties of the solution. Such properties can include, for example, the ability to remove one or more impurities from the vapor 108 and/or a high immiscibility with oil. Adjustment or optimization of one or more of foregoing properties may be achieved by altering the concentration of the one or more chemical amendments within the pH adjusted solution 112. For example, the presence, combination, and/or concentration of one or more materials within the pH adjusted solution 112 can optimize removal of contaminants from the vapor 108 as it interacts with the pH adjusted solution 112. In various embodiments, the pH adjusted solution can include strong and/or weak inorganic acids (e.g. hydrochloric acid, acetic acid), one or more pH buffer solutions (e.g., acetic acid+sodium acetate), one or more chelating agents (e.g., ethylenediaminetetraacetic acid (EDTA)), and/or one or more coagulants and/or flocculants (e.g. calcium hydroxide, polyacrylamide).

The vapor treatment system 110 can be configured to effect direct contact between the vapor 108 received therein and the pH adjusted solution 112, as depicted at the broken arrow 114. For example, as further discussed below, in some embodiments, the pH adjusted solution 112 may be sprayed into contact with the vapor 108, whereas in other embodiments, the vapor 108 may be bubbled through the solution 112. The pH adjusted solution 112 can absorb or dissolve portions of the vapor 112 (e.g., organic acids, inorganic acids, metals, metalloids, and/or certain polar organic molecules). The pH adjusted solution 112 also can be provided at a lower temperature than that of the vapor 108 such that the solution 112 condenses at least those portions of the vapor 112 that are immiscible therein (e.g., non-polar organic molecules).

Those portions of the condensed vapor 108 that are immiscible in the pH adjusted solution 112 (i.e., the hydrophobic portions) can be readily separated from the solution 112, as indicated at the broken arrows 116. In some embodiments, the separation (or at least one or more stages thereof) takes place within the vapor treatment system 110, whereas in other embodiments, the separation (or at least one or more stages thereof) takes place within a separator that is independent of the vapor treatment system 110 (see, e.g., FIG. 2).

In some embodiments, the immiscible portions are removed from the vapor treatment system 110 as a form of crude oil 118. The crude oil 118 thus can have few or no impurities, as the impurities that were present in the plastic feedstock 106 are dissolved or absorbed into the pH adjusted solution 112. In some embodiments, at least some of the dissolved or absorbed impurities can remain within the pH adjusted solution 112 within the vapor treatment system 110. For example, in some instances, after the pH adjusted solution 112 has amassed the impurities, it may continue to be used within the vapor treatment system 110, such that the impurities are not removed (at least not immediately) from the vapor treatment system 110. In other or further embodiments, dissolved or absorbed impurities are removed from the vapor treatment system 110 separately from the oil 118, as shown at the arrow 120.

Certain classes of polar organic molecules may only partially (or at least partially) partition into the pH adjusted solution 112. For example, a portion of certain alcohols, ketones, ethers, phenols, carboxylic acids, and/or other polar organic molecules may partition into the pH adjusted solution 112 and another portion thereof may partition into the crude oil 118. Accordingly, in some embodiments, crude oil 118 that includes a portion of a species of polar organic molecules may be separated from a pH adjusted solution 112 that contains another portion of the species of polar organic molecules.

The vapor 108 may include portions that do not condense within the vapor treatment system 110 and are not absorbed by the pH adjusted solution 112. Such non-condensable gases 121 can be removed separately from the vapor treatment system 110, and may be combusted or disposed of in any other suitable manner.

In various embodiments, the vapor treatment system 110 may operate under vacuum conditions, or under negative pressure. In other embodiments, the vapor treatment system 110 may operate under positive pressure. In still other or further embodiments, the vapor treatment system 110 may operate under atmospheric pressure conditions, or under any suitable combination of the foregoing (e.g., the pressure may be varied during a condensing event).

The system 100 can be well suited for quickly cracking or depolymerizing the plastic feedstock 106. For example, in some embodiments, heating of the plastic feedstock 106 and conversion thereof into the vapor 108 can be performed at high temperatures at which a variety of different molecular species may be gasified simultaneously. Such different molecular species might have different vaporization temperatures at a given pressure, and a temperature at which the plastic feedstock 106 is heated can exceed this temperature for some or all of the molecular species. The molecular species can then be separated from each other when the vapor 108 is delivered to the vapor treatment system 110, as previously described. Accordingly, the system 100 can operate without the heating system 102 slowly heating up and occasionally holding steady at various discreet temperature levels along the way so as to allow for individual molecular species to be gasified sequentially. It is to be appreciated, however, the system 100 may also be used in an operational mode in which the heating system 102 and the plastic feedstock 106 progress through a series of sequential heating steps or levels, as just described.

Figure 2:
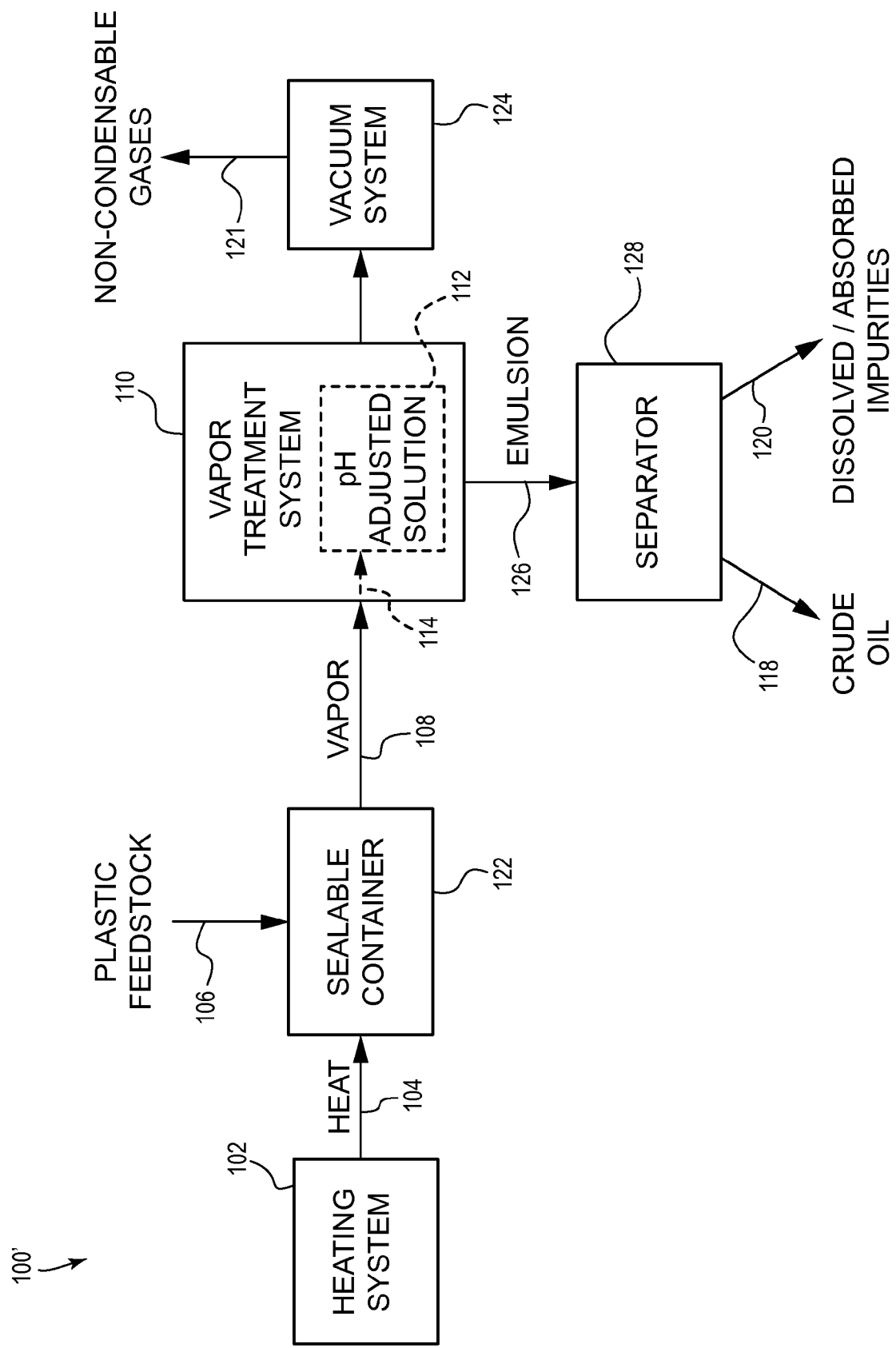
FIG. 2 is a schematic flow diagram of another embodiment of a plastic recycling system.

FIG. 2 depicts a process flow diagram of another embodiment of a plastic recycling system 100, which resembles the system 100. The system 100 includes a heating system 102 that provides heat 104 to a plastic feedstock 106. The plastic recycling system 100 further comprises a sealable container 122 that retains the plastic feedstock 106 during the heating. The container 122 can be configured to hold a negative pressure therein.

The system 100 can include a vacuum system 124 that is configured to maintain a negative pressure within the container 122 and within a vapor treatment system 110. The vacuum system 124 can continuously evacuate gases from the container 122 such that depolymerization of the plastic feedstock 106 occurs in an oxygen-deprived or oxygen-free environment. The vacuum system 124 draws the vapor 108 into the vapor treatment system 110, where it is contacted by the pH adjusted solution 112. The vacuum system 124 draws the non-condensable gases 121 from the vapor treatment system 110, and may distribute them to a combustion unit or other suitable disposal device.

The system 100 includes a separator 128 that receives an emulsion 126 of condensed material from the vapor treatment system 110. The emulsion 126 can comprise crude oil 118 that includes a small amount of the pH adjusted solution 112 entrained therein. The separator 128 can be configured to separate the crude oil 118 from the pH adjusted solution 112 based on the difference in relative density between these materials. For example, the separator 128 can comprise a settling tank that allows gravitational separation of the solution 112 from the crude oil 112. In other embodiments, the separator 128 may comprise a centrifuge.

Figure 3:
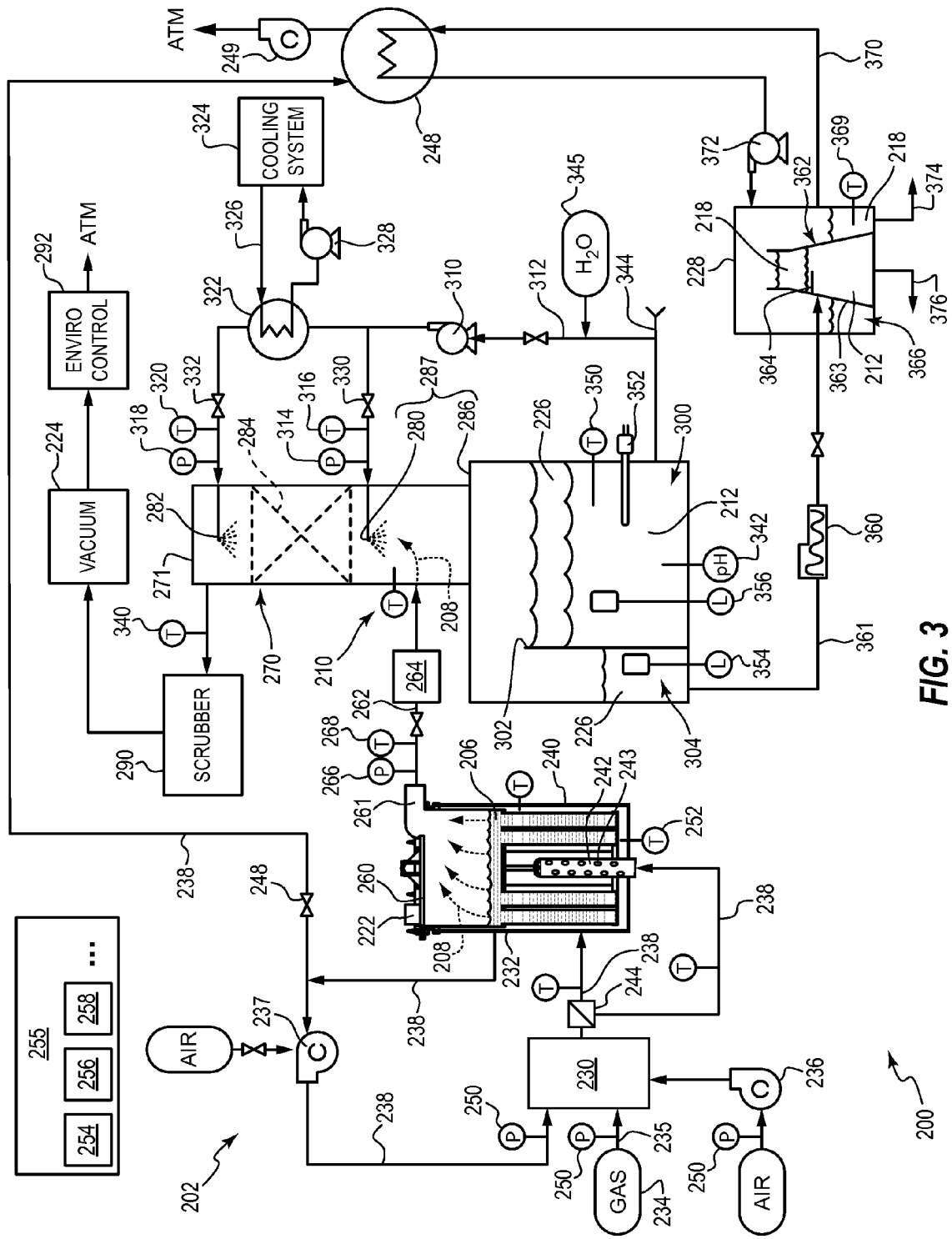
FIG. 3 is a schematic flow diagram of another embodiment of a plastic recycling system.

FIG. 3 illustrates another embodiment of a plastic recycling system 200, which can resemble the plastic recycling systems 100, 100 described above in certain respects. Accordingly, like features are designated with like reference numerals, with the leading digits incremented to "2." For example, the plastic recycling system 200 includes a heating system 202, a sealable container 222, a vapor treatment system 210, a vacuum system 224, and a separator 228. Likewise, the vapor treatment system 210 includes a pH adjusted solution 212 such as the pH adjusted solution 112 described above. Relevant disclosure set forth above regarding similarly identified features thus may not be repeated hereafter.

The illustrated heating system 202 includes a burner 230 and a heating plenum 232. The burner 230 can comprise any suitable combustion burner, which may be configured to run on any suitable fuel. The fuel may be supplied by a fuel train 234, such as natural gas or propane piping. The fuel train 234 can include any suitable combination of flow switches and valves (not shown) to allow for the desired amount of fuel to be delivered to the burner 230. Fuel from the fuel train 234 can be delivered via any suitable fuel delivery line 235, such as conduit or piping.

The burner 230 can be in fluid communication with a combustion blower 236 and a circulation fan 237, each of which may have variable speed capabilities. The combustion blower 236 supplies fresh air to the burner 230, whereas the circulation fan 237 circulates heated exhaust from the heating plenum 232 back to the burner 230. The circulation fan 237 also can selectively draw in fresh air to provide a desired exhaust/air mixture to the burner 230. The heating system 202 can comprise any suitable arrangement of ducts 238 for transporting air from one portion of the heating system 202 to another.

The heating plenum 232 is configured to selectively receive therein the sealable container 222, which may also be referred to as a cartridge. When situated within the heating plenum 232, the container 222 can seal, or substantially seal, the plenum such that heated air may circulate within the heated plenum but not escape into the surrounding atmosphere. Illustrative examples of heating plenums 232 and containers 222 that may be used with the plastic recycling system 200 are disclosed in U.S. patent application Ser. No. 12/791,911, filed Mar. 31, 2010, titled DEVICES, SYSTEMS, AND METHODS FOR RECYCLING PLASTIC.

The container 222 can retain a quantity of plastic feedstock 206 therein, which can be melted and vaporized as a result heat delivered thereto by the heating plenum 232, as further discussed hereafter. In the illustrated embodiment, the heating plenum 232 includes a sidewall 240 and an inner conduit 242, which rises upwardly at an interior of the sidewall 240. The sidewall 240 can include a series of ports (not shown) through which heated air can be delivered inwardly (e.g., toward the inner conduit 242), and the inner conduit 242 can include a series of ports 243 through which heated air can be delivered outwardly (e.g., toward the sidewall 240).

The sidewall 240 can be in fluid communication with a first duct line 238 from the burner 230, and the inner conduit 242 can be in fluid communication with a second duct line 238 from the burner 230. A damper 244 can be situated relative to the first and second duct lines 238 so as to control the relative amount of heated air that is delivered to the sidewall 240 and to the inner conduit 242.

Heated exhaust that has been used to heat the container 222 can be removed from the heating plenum 232 via a separate duct line 238 and circulated to the burner 230 by the fan 237. At least a portion of the heated exhaust may be diverted and delivered to a heat exchanger 246 by opening a valve 248 and activating a venting fan 249. The heat exchanger 248 is described further below.

Although the illustrated embodiment of the heating system 202 uses heated air to heat the container 222 and its contents, it is to be appreciated that any other or further suitable mechanisms for heating the container 222 and its contents are also possible. For example, a heated fluid other than air (e.g., a heated liquid) may be circulated through the heating plenum 232. In other or further embodiments, heating mechanisms may include electrical direct contact heating, induction heating, or radiant heating.

The heating system 202 can further include a variety of sensor and control components. For example, the heating system 202 can include one or more pressure sensors 250 and/or temperature sensors 252, which can provide to a subsystem controller 254 various data regarding the operation of the burner 230 and the amount of heat being delivered to the container 222. The sensors 250, 252 can communicate with the subsystem controller 254 in any suitable manner, such as by wired or wireless connection. In the illustrated embodiment, communication lines (e.g., electrical wires) connect the sensors 250, 252 to the subsystem controller 254. Likewise, communication lines can connect other components of the heating system 202 (e.g., the blower 236 and the fan 237) to the subsystem controller 254. The communication lines are not shown in FIG. 3 so as not to obscure the drawing.

The subsystem controller 254 can alter operational parameters of the heating system 202 in response to data received from the sensors 250, 252, and/or as a result of other programming. For example, if it is determined from temperature sensors 252 that are associated with the inner conduit 242 and the sidewall 240 that the temperature of heated air being delivered to an inner portion of the container 222 is deficient, the control system 254 can compensate by changing a setting of the damper 244 so that more heat is delivered to the inner conduit 242 and less is delivered to the sidewall 240. In some applications, it may be desirable to selectively alter the relative amounts of heat delivered to a peripheral region and a central region of the container 222 over the course of a heating cycle. In some instances, if it is determined that all temperatures throughout the heating plenum 232 are too low, the control system 254 may increase a speed of the blower 236 and/or the fan 237. In other or further embodiments, any desired alteration to the operational parameters of the heating system 202 may be effected manually.

A master control system 255 may be configured to communicate with the subsystem controller 254 (e.g., via an Ethernet cable or other suitable communication device, whether wired or wireless), and may also be configured to communicate with additional subsystem controllers 256, 258, etc. that are each dedicated to other subsystems of the plastic recycling system 200. For example, separate subsystem controllers 256, 258 may be dedicated to the vapor treatment system 210 and the vacuum system 224, respectively. In some embodiments, the subsystem controllers 254, 256, 258 are situated locally (e.g., near the various subsystems with which they are associated), whereas the master control system 255 may be situated in a supervisory station in which an operator can monitor the instantaneous status of the multiple subsystems of the system 200 and can make changes thereto as desired, whether onsite or offsite.

For the sake of convenience, the subsystem controller 254, 256, 258 associated with a particular component may not be identified hereafter, nor will it be explicitly stated that a particular subsystem controller 254, 256, 258 and/or the master control system 255 is able to monitor and/or control the operation of a particular component of the plastic recycling system 200, although such is understood. It is also noted that steps or control events discussed herein which can be effected the controllers 254, 256, 258 and/or the master control system 255 may be embodied in machine-executable instructions that are to be executed by a general-purpose or special-purpose computer (or other electronic device). Alternatively, the steps or control events may be performed or instigated by hardware components that include specific logic for performing the steps or control events, or by a combination of hardware, software, and/or firmware. Some or all of the steps may be performed locally (e.g., via a subsystem controller) or remotely (e.g., via the master control system 255).

As previously discussed, the sealable container 222 may be selectively coupled with the heating plenum 232 or removed therefrom. In some embodiments, the container 222 is positioned externally to the heating plenum 232 for filling. A lid 260 is removed or otherwise opened to permit entry of the plastic feedstock 206. Once the container 222 has been filled, the lid 260 can then be closed and the container 222 can be hoisted (e.g., via a crane) into the heating plenum 232. The container 222 can cooperate with the heating plenum 232 to prevent heated exhaust gases from exiting from the heating plenum 232 at a connection interface between the container 222 and the heating plenum 232.

An evacuation port 261 of the container 222 can be connected to a gas transfer line 262. The gas transfer line 262 can be in fluid communication with the vapor treatment system 210 which, in turn, can be in fluid communication with the vacuum system 224. Accordingly, connection of the gas transfer line 262 to the evacuation port 261 can place the contents of the container 222 under vacuum, and the heating of the contents thus may take place in an oxygen-deprived or oxygen-free environment.

As the container 222 is heated, the plastic feedstock 206 can melt and eventually gasify or vaporize. The resultant vapor 208 is drawn from the container 222 through the evacuation port 261, through the gas transfer line 262, and then into the vapor treatment system 210. In certain embodiments, the gas transfer line 262 includes a knock out tank 264, which can have a volume greater than that schematically depicted in FIG. 3. The knock out tank 264 can comprise a container that acts as a failsafe in the event that the contents of the container 222 are rapidly forced through the evacuation port 261, which could result from a large pressure fluctuation within the container 222 (e.g., due to an undesired ignition of gases). Such expelled contents can be collected in the knock out tank 264 and prevented from entering the vapor treatment system 210. In other embodiments, the knock out tank 264 is omitted (see FIG. 7).

A pressure sensor 266 and a temperature sensor 268 can be positioned in the gas transfer line 262 to monitor the pressure and temperature of the vapor 208 as it exits the container 222. In some embodiments, one or more of the temperature and pressure readings can be used to determine when vaporization of the plastic feedstock 206 is at or near completion such that the container 222 is ready to be removed from the heating plenum 232 and replaced with a filled container 222. For example, in some embodiments, a heating temperature within the heating plenum 232 can be maintained at a substantially constant level or set point value (e.g., at about 1100 degrees Fahrenheit, in some embodiments). A temperature of the vapor 208 can rise to a maximum level (e.g., a time-averaged maximum level) during the heating, and can steadily remain near the maximum level (e.g., can sustain only minor fluctuations) as the vaporization continues. As the process nears completion and fewer gases are created, the temperature of the vapor 208 exiting the container 222 can drop. A size of this drop can signal that the container 222 should be replaced. In various embodiments, a replacement event may be signaled when the temperature of vapor 208 drops within a range of from about 10 to about 30 percent of the maximum level, or drops within a range of from about 15 to about 25 percent of the maximum level. In some embodiments, a replacement event may be signaled with the temperature drops by an amount equal to or greater than about 15, 20, 25, or 30 percent. In other or further embodiments, a replacement event may be signaled when the temperature drops from the maximum level by no less than about 80, 90, or 100 degrees Fahrenheit. In still other or further embodiments, a replacement event may be signaled by the passage of no less than about ½, ¾, or 1 hour after the maximum level is reached.

Figure 4:
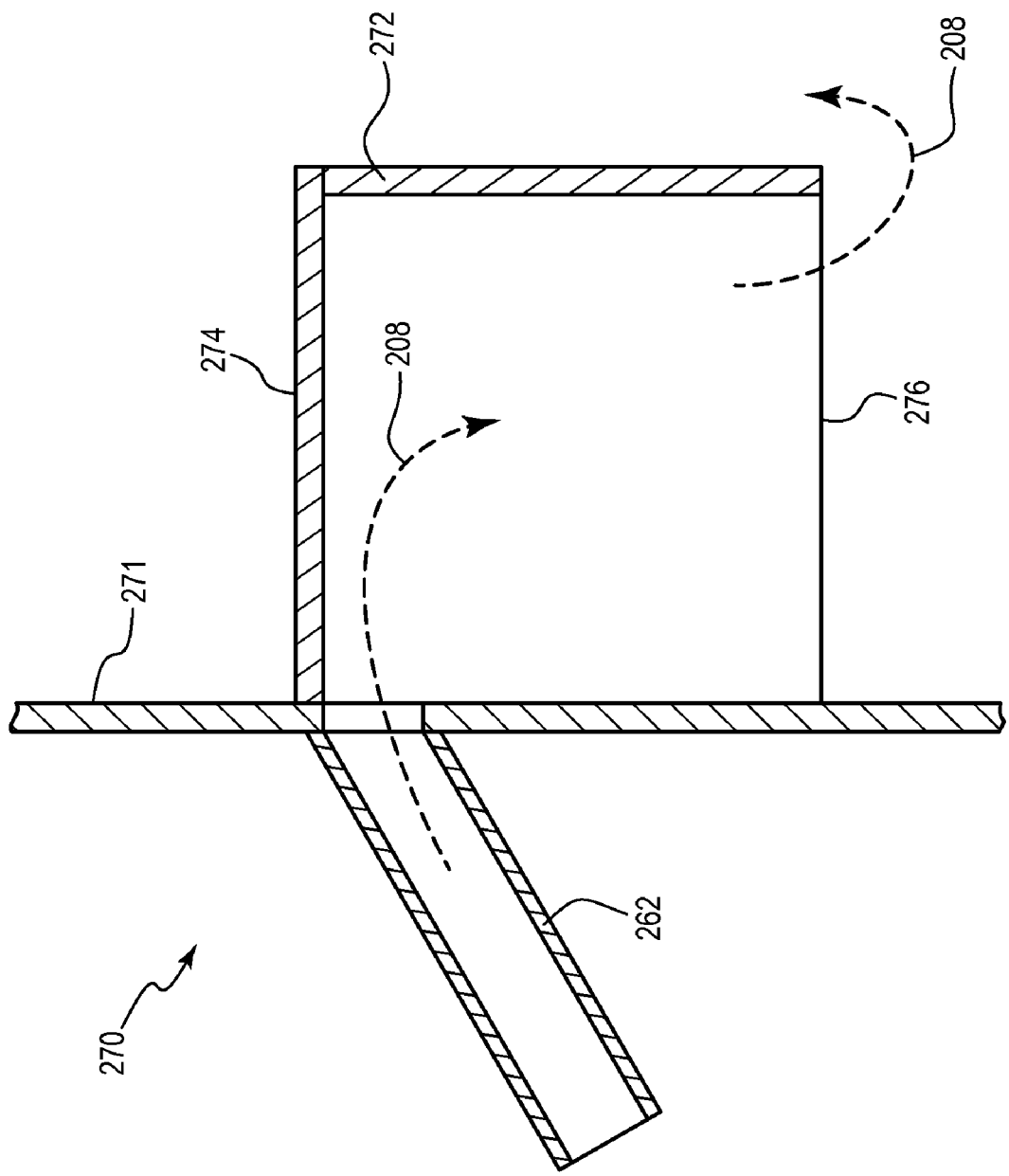
FIG. 4 is a cross-sectional view of an embodiment of a baffle that is compatible with an embodiment of a condenser that may be used in the system of FIG. 3.

With reference to FIGS. 3 and 4, the vapor 208 can be introduced into the vapor treatment system 210 in any suitable manner. In the illustrated embodiment, the vapor treatment system 210 includes a condenser 270 and a reservoir 286. As shown in FIG. 3, in some embodiments, the vapor 208 is introduced into a condensing tower 271 of the condenser 270 substantially without altering a trajectory of the vapor 208. As shown in FIG. 4, in other embodiments, the vapor 208 encounters a baffle 272 upon entering the condensing tower 271. The vapor 208 can initially hit a guard plate 274, and can then be routed downward and outwardly about a bottom edge 276 of the baffle 272. The baffle 272 can be configured to provide the vapor 208 with an even flow pattern. In particular, the baffle 272 can cause the vapor 208 to rise in a uniform distribution about a periphery of the bottom edge 276.

FIG. 4 also illustrates that the gas transfer line 262 may be angled upwardly toward the condensing tower 271. Such an arrangement can permit any condensed material that may collect in the gas transfer line 262 to flow down the line 262 and into the knock out tank 264 (FIG. 3). This may be of a particular benefit when the plastic recycling system 200 is shut down and hot vapor 208 no longer flows through the gas transfer line 262 so as to keep the line clear. For embodiments that do not include a knock out tank 264, the condensed material may instead flow down the line 262 to any suitable fluid collection point.

With continued reference to FIG. 3, the condenser 270 can include a lower sprayer 280 and an upper sprayer 282 that are separated from each other by one or more sections of column packing 284. For example, three sections of column packing 284 may separate the upper and lower sprayers 282, 280. Each of the upper and lower sprayers 282, 280 provides a spray or shower of the pH adjusted solution 212, but at different temperatures. The lower sprayer 282 can provide a spray at a higher temperature (e.g., a warm temperature, such as, for example, within a range of from about 120 to about 150 degrees Fahrenheit), whereas the upper sprayer 280 can provide a spray at a lower temperature (e.g., a cool temperature, such as, for example, within a range of from about 70 to about 80 degrees Fahrenheit).

The lower sprayer 282 may be used primarily as a cleaning device for removing impurities from the vapor 208. A temperature of the lower sprayer 282 may be sufficiently high to permit the pH adjusted solution 212 to dissolve or absorb portions of the vapor 208 substantially without condensing any other portion of the vapor 208. The sprayed pH adjusted solution 212 can drop into a reservoir 286, which is discussed further below. Accordingly, the lower sprayer 282 and/or the reservoir 286 may be used to separate impurities from the vapor 208, and thus may be referred to individually or collectively herein as a washing system or cleaning system 287.

After passing through the lower sprayer 282, the remaining portion of the vapor 208 passes upwardly through the column packing 284 and loses energy thereto. The vapor 208 then encounters the lower temperature pH adjusted solution 212 that is sprayed from the upper sprayer 282. At least a portion of the remaining vapor 208 is thus condensed and drops into the reservoir 286. The pH adjusted solution 212 that is sprayed from the upper sprayer 282 thus may also be referred to as a condensing liquid.

Those portions of the vapor 208 that are not condensed (i.e., non-condensable gases) are then passed to a caustic scrubber 290, which passes the remaining vapor 208 through a caustic solution so as to chemically scrub the vapor (e.g., remove mercaptan sulfur species therefrom) and so as to neutralize trace levels of free inorganic acids. The remainder of the vapor 208 passes from the caustic scrubber 290 through the vacuum system 224, and is then pushed to an environmental control device 292.

Figure 5:
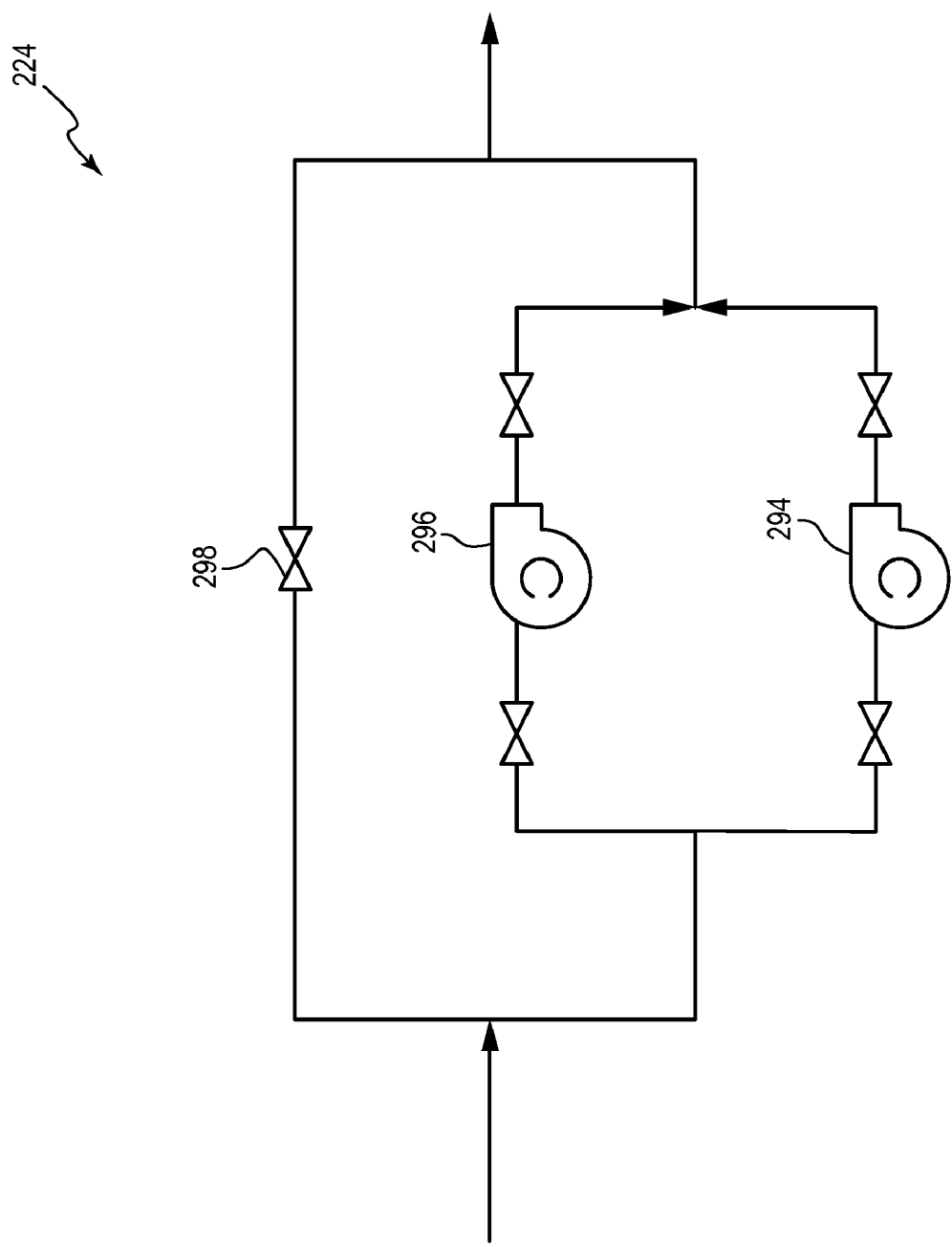
FIG. 5 is a schematic flow diagram of an embodiment of a vacuum system that is compatible with the plastic recycling system of FIG. 3.

Any suitable vacuum system 224 may be used with the plastic recycling system 200. One illustrative embodiment is depicted in FIG. 5. The vacuum system 224 includes a first blower 294 and a second blower 296 that are in parallel with each other. One or more valves 298 may be included in parallel with the blowers 294, 296. In such an arrangement, both blowers 294, 296 may be used at startup of the plastic recycling system 200 in order to place the vapor treatment system 210 and the container 222 under vacuum, whereas only one blower 294, 296 may be used once the recycling system 200 is operational. The vacuum system 224 may cycle between use of the blowers 294, 296 to keep their usage times approximately equal. Moreover, the valve 298 may be maintained in a slightly open or vented configuration, which can result in a relatively uniform vacuum during a transition between blowers 294, 296, as well as during sustained operation of either blower 294, 296.

In some instances, it can be desirable to maintain a vacuum in the container 222, the vapor treatment system 210, and the caustic scrubber 290 during operation of the system 200. For example, in some embodiments, the vacuum system 224 (which may more generally be referred to as a pressure system) provides a magnitude of negative pressure that is sufficiently great to maintain a vacuum within the container 222, as well as other portions of the system 200 that are in fluid communication therewith, even if spikes of positive pressure occur as the plastic feedstock 206 is being vaporized. In some embodiments, the vacuum system 224 maintains a negative pressure that has a magnitude of no less than about 8, 10, or 12 inches of water column.

In other embodiments, a pressure system may provide a positive pressure within the container 222, the vapor treatment system 210, and the caustic scrubber 290. In still other embodiments, a pressure system (e.g., the vacuum system 224) may be omitted from or not used in the plastic recycling system 200. For example, atmospheric pressure conditions may be maintained within the container 222, the vapor treatment system 210, and the caustic scrubber 290. Providing higher pressures to the plastic recycling system 200 can cause the vapor 208 to be heated for longer periods within the container 222, which can result in greater depyrolization and lighter organic molecules within the vapor 208. Under such conditions, more fuel from the fuel train 234 may be consumed to provide the vapor 208 with sufficient energy to pass through the system 210.

Any suitable environmental control device 292 can be used with the plastic recycling system 200. In some embodiments, the environmental control device 292 can comprise a burner or other combustion device. For example, in some embodiments, the environmental control device 292 can comprise a CEB® clean enclosed burner, which is available from N. V. Bekaert S. A., of Kortrijk, Belgium. In the illustrated embodiment, exhaust from the environmental control device 292 is shown as being vented to atmosphere. In other embodiments, the hot exhaust may instead be transferred to other portions of the plastic recycling system 200. For example, in some embodiments, exhaust from the environmental control device 292 can be delivered to the heating system 202 and may be used to heat the container 222.

Referring again to the reservoir 286, the absorbed and condensed portions of the vapor 208 drop into a tank 300 that includes a weir 302 at an upper edge thereof. The pH adjusted solution 212, which retains the absorbed impurities, may facilitate coagulation of some contaminants which have a greater relative density than the condensed crude oil material, and may settle to the bottom of the tank 300. Accordingly, the condensed crude oil rises to the top of the tank 300 and flows over the weir 302 into a temporary containment region 304. At this stage, the crude oil may be slightly emulsified with the pH adjusted solution 212 (e.g., may have a small quantity of pH adjusted solution 212 entrained therein), and thus this material that consists primarily of crude oil may be referred to as an emulsion 226. As discussed further below, the emulsion 226 can be removed from the containment region 304 and delivered to a separator or settling tank 228.

The pH adjusted solution 212 within the tank 300 can be cycled to the lower and upper sprayers 280, 282. In particular, a circulation pump 310 can move solution 212 from the tank 300 through a fluid line 312 to each of the sprayers 280, 282. The pressure and temperature at the lower and upper sprayers 280, 282 can be monitored by separate pressure sensors 314, 318 and separate temperature sensors 316, 320, respectively. A portion of the fluid line 312 can pass through a heat exchanger 322, which is coupled to a cooling system 324 through a cooling loop 326. The cooling system 324 can be of any suitable variety, and may include a cooling tower and/or a chiller. A cooling line pump 328 can control a flow of cooling fluid through the cooling loop 326. Pressure and temperature at each of the sprayers 280, 282 can be controlled by adjusting one or more settings of the circulation pump 310, the cooling line pump 328, the cooling system 324, and/or a valve 330 associated with the lower sprayer 280 and a valve 332 associated with the upper sprayer 332.

As previously discussed, in some embodiments, it is desirable to maintain the lower sprayer 280 at a temperature that is within a range of from about 120 to about 150 degrees Fahrenheit. Such a temperature range can be too high to effect condensation of organic molecular species that are within the vapor 208, and may also facilitate absorption of impurities from the vapor 208. Additionally, crude oil that collects in the tank 300 and in the containment region 304 can be in a liquid or free flowing state within it is within such a temperature range, or when it is at a temperature slightly above such a range. Accordingly, when the solution 212 that is ejected from the lower sprayer 280 is within such a temperature range, the solution 212 and the emulsion 226 that are in the reservoir 286 can be maintained at a temperature that is within this temperature range, or that is higher than this range, due to absorption of heat from the incoming vapor 208.

In some embodiments, it is desirable to maintain the upper sprayer 282 at a temperature that is within a range of from about 70 to about 80 degrees Fahrenheit. For example, such a temperature range can be well suited for condensing organic molecules. Additionally, it can be desirable for certain gases exiting the vapor treatment system 210 (e.g., methane, ethane, propane, and/or butane) to remain in a gaseous state so that they may be burned more readily in the environmental control device 292. Accordingly, data obtained by a temperature sensor 340 that is at an exit port of the vapor treatment system 210 can be used in adjusting a temperature of the upper sprayer 282 to a desired value.

In other embodiments, the vapor treatment system 210 may include a single sprayer, such as the upper sprayer 282. The single sprayer 282 can simultaneously effect both absorption of impurities and condensation of the crude oil. In certain of such embodiments, it may be desirable to add to or alter certain separation steps discussed below, since the resultant emulsion 226 may include a greater number of impurities (e.g., due to a greater degree of entrainment of the pH adjusted solution 212 and/or dissolved or free impurities within the crude oil 218). For example, it may be desirable to permit the emulsion 226 to settle within the settling tank 228 for a longer period of time.

As the pH adjusted solution 212 absorbs impurities from the vapor 208, a composition of the solution can change. For example, in some embodiments, the pH adjusted solution 212 may become more or less acidic. Accordingly, in some embodiments, a pH sensor 342 can be included within the tank 300 to monitor the composition of the solution 212. The fluid line 312 can include an pH adjustment port 344 through which an acid or other suitable material may be added to the solution 212 that is circulated from the reservoir 286. For example, an acid may be introduced into the fluid line via the pH adjustment port 344 when it is determined from the pH sensor 342 that the acidity of the solution 212 has dropped. Water from a makeup water source 345 may be added to the fluid line 312. For example, if an acidic level of the pH adjusted solution 212 that is within the reservoir 286 has increased beyond an upper threshold, water from the makeup water source 345 may be added to the fluid line 312.

In some embodiments, a temperature sensor 350 is included in the reservoir 286 (e.g., within the tank 300) to ensure that the temperature of the reservoir 286 does not drop below a desired level. For example, as previously discussed, it may be desirable to maintain the temperature within the reservoir 286 at a level at which the oil or emulsion 226 is in a liquid or flowable state. A heating element 352 may be used in conjunction with the temperature sensor 350 to keep the oil and water within the reservoir 286 warm, such as during periods of shutdown.

In certain embodiments, the reservoir 286 includes a level sensor 354 to monitor a level of the oil or emulsion 226 and includes another level sensor 356 to monitor a level of the pH adjusted solution 212. Data obtained from the level sensor 354 can be used in controlling a pump 360, which is configured to pump emulsion 226 from the temporary containment region 354 to the settling tank 228. The pump 360 may comprise any suitable variety of pump, and may be well suited for pumping thick material which may be highly viscous. For example, the pump 360 may comprise a positive displacement pump.

The emulsion 226 can be pumped through a heat traced line 361 into a separation tank 362 contained within the settling tank 228. The separation tank 362 can include angled sidewalls 363 and an entry baffle 364. The separation tank 362 can encourage further separation of the crude oil 218 from the pH adjusted solution 212, such as by separation due to relative densities. The crude oil 218 can flow over an upper edge of the separation tank 362 into a holding area 366. The crude oil 218 can removed from the holding area 366 and stored or transported as desired. For example, the oil 218 can be moved to a storage tank or transported to a refinery (e.g., via an oil tanker).

The crude oil 218 may be relatively waxy and solid at room temperature. Accordingly, it may be desirable to maintain the crude oil 218 in a liquid form to facilitate separation of the solution 212 therefrom and/or removal of the oil 218 from the settling tank 228. The settling tank thus may include a temperature sensor 369, which can be used to selectively activate a heating fluid loop 370 that is in communication with the heat exchanger 248. A heating line pump 372 can control the flow of heating fluid through the heating fluid loop 370.

Removal of the crude oil 218 from the settling tank 228 is illustrated by the arrow 374. The pH adjusted solution 212 likewise can be removed from the settling tank 228, as indicated by the arrow 376. In some embodiments, the pH adjusted solution 212 is returned to the reservoir 286, and may thereafter be cycled through the sprayers 280, 282.

With continued reference to FIG. 3, it is again noted that during operation of the heating system 202 and the container 222, heated air is circulated within the heating plenum 232 so as to melt the plastic feedstock 206 and convert it into one or more gases within the vapor 208. A vacuum is applied via the evacuation port 261 so as to remove the vapor 208 from the container 222. The removed gases can then be processed as desired.

Upon removal of all or substantially all of the desired gases from the container 222, the container 222 can be removed from the heating plenum 232 and replaced with an additional container 222 that has been charged with a quantity of the plastic feedstock 206. The foregoing heating a vapor removal processes can then be repeated, and the removed container 222 can be cleaned and charged with plastic feedstock 206 for future use. The successive coupling, heating, removal, and replacement of a series of charged containers 222 for a single heating plenum 232 can be referred to as a batch process.

Figure 6:
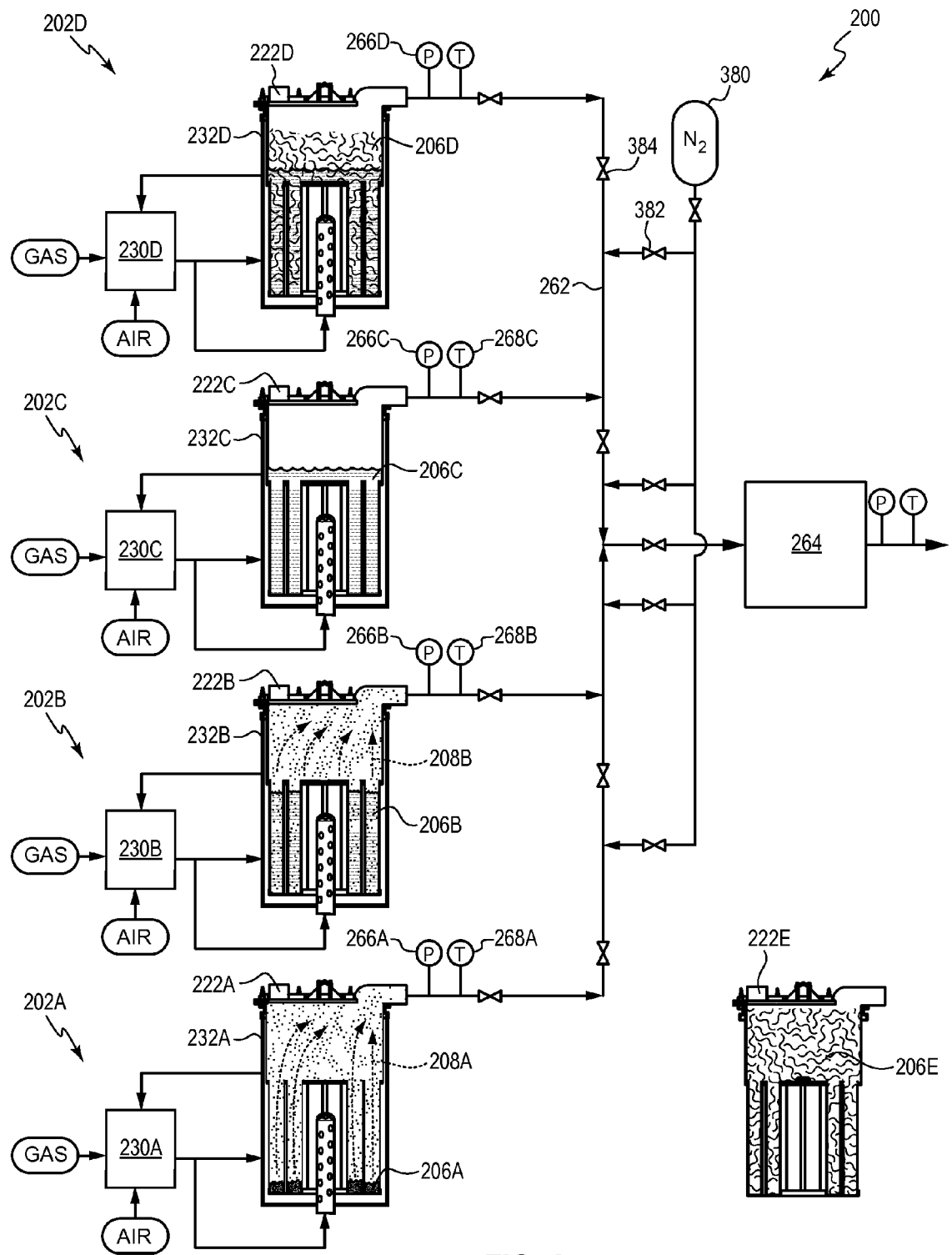
FIG. 6 is a schematic flow diagram of an embodiment of a series of heating systems and containers in which the containers are commonly joined to a gas transfer line, wherein plastic feedstock within the containers is being vaporized and removed from the containers in a continuous batch process.

FIG. 6 illustrates another embodiment of the plastic recycling system 200 in which plastic feedstock may be vaporized and processed in a manner that is referred to herein as a continuous batch process. The plastic recycling system 200 can be identical to the embodiments described above with respect to FIG. 3, except that the system 200 includes four separate heating systems 202A, 202B, 202C, 202D, each with a separate burner 230A, 230B, 230C, 230D that is configured to heat a separate heating plenum 232A, 232B, 232C, 232D. Although not shown in FIG. 6, an optional exhaust path from each of the heating plenums 232A, 232B, 232C, 232D can be provided to the heat exchanger 248 (see FIG. 3).

Each heating plenum 232A, 232B, 232C, 232D is configured to receive a separate container 222A, 222B, 222C, 222D therein, and each container can be filled with a separate quantity of plastic feedstock 206A, 206B, 206C, 206D. As illustrated in FIG. 6, a first container 222A can be inserted in a first heating plenum 232A and heated for a first period of time; a second container 222B can be inserted in a second heating plenum 232B at the end of the first period, and both the first and second containers 222A, 222B can be heated for a second period; a third container 222C can be inserted in a third heating plenum 232C at the end of the second period, and the first, second, and third containers 222A, 222B, 222C can be heated for a third period; and a fourth container 222D can be inserted in a fourth heating plenum 232D at the end of the third period, and the first, second, third, and fourth containers 222A, 222B, 222C, 222D can be heated for a fourth period.

FIG. 6 illustrates a point in time at the end of the fourth period of heating time. As shown, nearly all of the plastic feedstock 206A has been vaporized and removed from the container 222A, such that only solid carbon material (e.g., non-hydrocarbon product) remains. By comparison, all of the plastic feedstock 206B has been melted within the second container 222B, and a portion thereof has been vaporized and removed; all of the plastic feedstock 206C has been melted within the third container 222C, but relatively little has been vaporized and removed; and only some of the plastic feedstock 206D has been melted within the fourth container 222D.

At this point in time, a filled fifth container 222E can be positioned near the first heating plenum 232A. The first container 222A can then be removed from the first heating plenum 232A and the fifth container 222E can be introduced into the first heating plenum 232A in its place. The fifth, second, third, and fourth containers 222E, 222B, 222C, 222D can then be heated for a fifth period of time. Replacement of a single container 222 at the end of a heating period can continue in series for each of the second, third, and fourth containers 222B, 222C, 222D, respectively, and can cycle through to the fifth heating plenum 222E.

As shown in FIG. 6, each of the containers 222A, 222B, 222C, 222D can be connected to the gas transfer line 262, which can supply a negative pressure via the vacuum system 224 (FIG. 3), as described above. Vapors, such as the vapors 208C, 208D, thus can be mixed within the gas transfer line 262 as they are delivered to the vapor treatment system 210. Such an arrangement thus can be relatively insensitive to the species of molecules that are contained within a vapor 208 from any given container 222. This insensitivity to molecular species can be particularly useful for a continuous batch mode operation, since the vaporization process can proceed without careful coordination among the various heating systems 202A, 202B, 202C, 202D to ensure that only a single molecular species is drawn simultaneously from the containers 222A, 222B, 222C, 222D. Stated otherwise, the recycling system 200 can operate properly, even when a variety of different molecular species are introduced into the vapor 206 of any given container 222 and/or even when a variety of different molecular species are introduced into the common gas transfer line 262 from multiple containers 222.

The gas transfer line 262 can include a series of pressure sensors 266A, 266B, 266C, 266D and/or temperature sensors 268A, 268B, 268C, 268D, which can be used in determining whether a container 222 is ready to be replaced, as discussed above. In other or further embodiments, the gas transfer line 262 can include a series of valves 384, which may be manipulated so as to permit removal of a container 222 without interrupting vapor collection from the remaining containers 222. In some embodiments, the recycling system 200 includes an inert gas purge system 380 that can be used to flush any portion of the gas transfer line 262. The inert gas purge system 380 can include a series of valves 382, which may be manipulated appropriately to introduce an inert gas where desired. In some instances, nitrogen or some other inert gas may be used to purge a full section of the gas transfer line 262 from process gases before removal of a spent container 222 and/or may be used to purge oxygen from (or to dilute oxygen within) a portion of the gas transfer line 262 after a new cartridge 222 has been connected thereto.

Measures may be taken to prevent or reduce heat losses when a container 222 is removed from its respective plenum 232 and replaced. For example, in some embodiments, a burner 230 is turned off just prior to removal of a container 222 from the associated heating plenum 232, and air can be drawn down into the heating plenum 232 as the container 222 is removed and replaced. The burner 230 can then be activated again once the new container 222 is in place.

The illustrated embodiment of the recycling system 200 includes four heating plenums 232. In some instances, a total of eight containers 222 may be used effectively with such a system, as some spent containers may be cleaned and filled while the remaining containers are in use. However, more or fewer containers may be used with such a system. Likewise, more or fewer heating plenums may be used in continuous batch processes.

Figure 7:
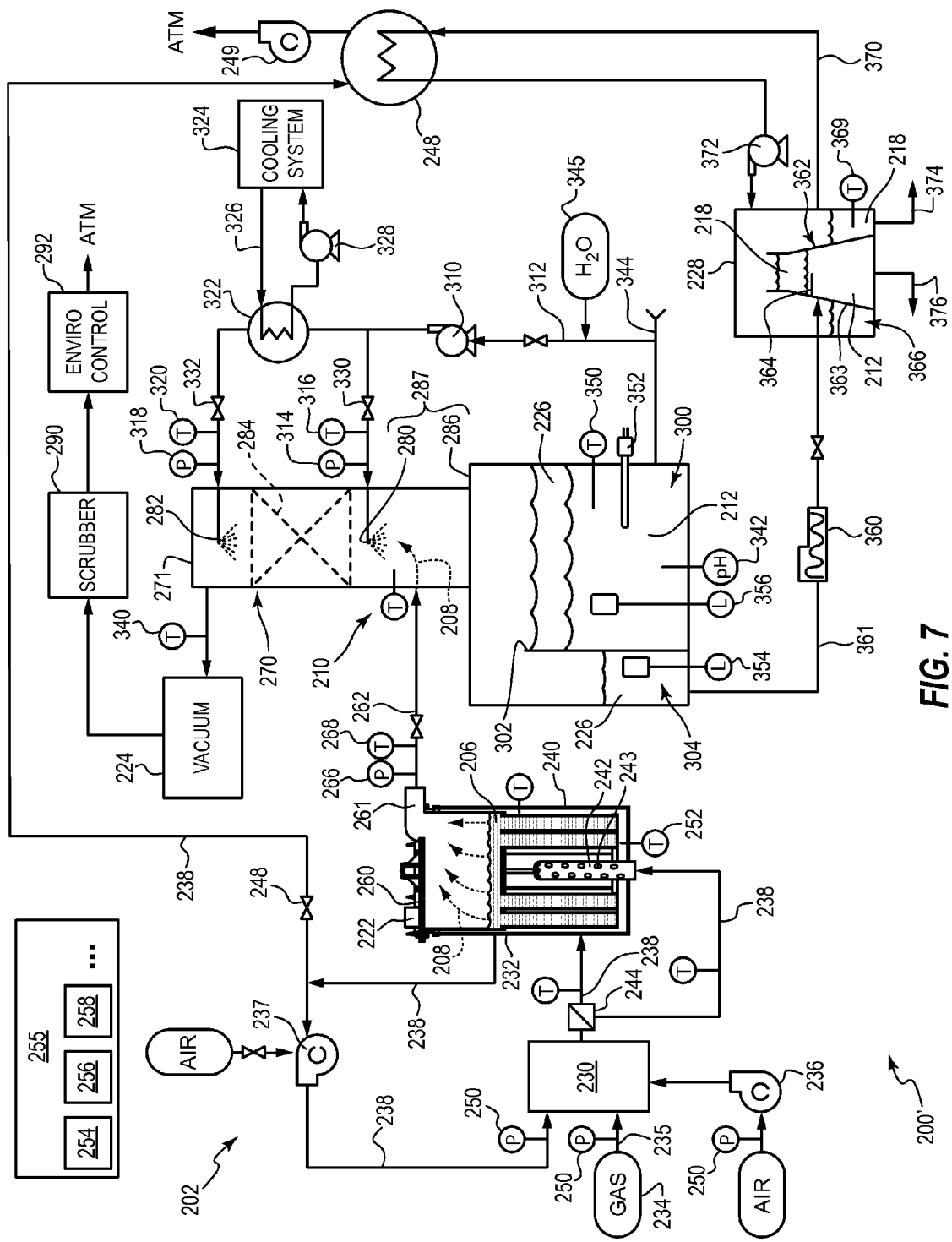
FIG. 7 is a schematic flow diagram of another embodiment of a plastic recycling system.

FIG. 7 illustrates another embodiment of a plastic recycling system 200, which is similar to the system 200 illustrated in FIG. 3. Like the system 200, the system 200 includes a vacuum system 224 and a caustic scrubber 290. However, the vacuum system 224 is situated in line with the scrubber 290 between the vapor treatment system 210 and the scrubber 290, rather than between the scrubber 290 and the environmental control device 292. The output of the scrubber 290 thus may be delivered directly to the environmental control device 292.

Other embodiments of the systems 200, 200 may each have multiple vapor treatment systems 210, which may each receive vapor 208 from one or more containers 222 within one or more heating systems 202. In arrangements similar to that shown in FIG. 7, the outputs of the multiple vapor treatment systems 210 may be delivered to an input end of the vacuum system 224, and a single output of the vacuum 224 may be delivered to the scrubber 290. In arrangements similar to that shown in FIG. 3, the outputs of the multiple vapor treatment systems 210 may each be delivered to an input end of a separate scrubber 290, such that the plastic recycling system 200 comprises multiple scrubbers 290. The outputs of the multiple scrubbers 290 can be delivered to a single vacuum system 224, and the vacuum system 224 can have a single output that is in fluid communication with the environmental control device 292. In still further embodiments, a single plastic recycling system 200 or 200 can include multiple vacuum systems 224 and multiple scrubbers 290.

Figure 8:
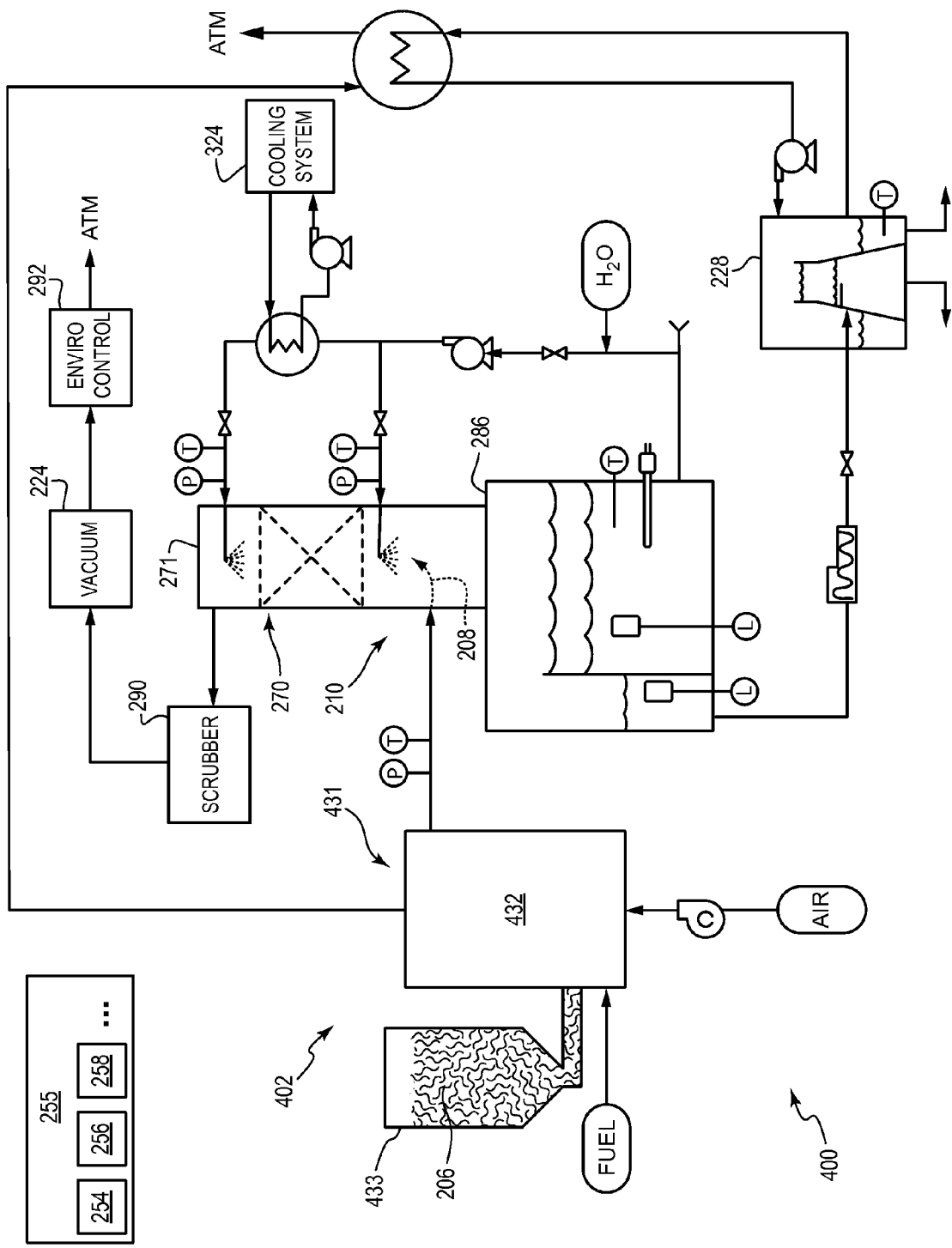
FIG. 8 is a schematic flow diagram of another embodiment of a plastic recycling system.

FIG. 8 illustrates another embodiment of a plastic recycling system 400, which can resemble the plastic recycling systems 200, 200 in many respects. Accordingly, like features are identified with like reference numerals. Moreover, specific features of the recycling system 400 may not be identified by reference numerals in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the recycling system 400. Any suitable combination of the features and variations of the same described with respect to the recycling system 200 can be employed with the recycling system 400, and vice versa. This pattern of disclosure applies equally to further embodiments depicted in subsequent figures and described hereafter.

The recycling system 400 includes a heating system 402 that is configured to depolymerize a plastic feedstock 206 in a continuous manner. In the illustrated embodiment, the heating system 402 comprises a heating unit 431 of any suitable variety, such as a fluidized bed burner 432 that is configured to effect rapid depolymerization of the plastic feedstock 206. Other suitable heating devices are also possible. The plastic feedstock 206 can be fed into the heating unit 431 by a gravity feed hopper 433 or any other suitable feeding mechanism that can provide a continuous supply of the plastic feedstock 206 to the fluidized bed burner 432. If desired, the plastic feedstock may be provided under vacuum or inert gas conditions.

Figure 9:
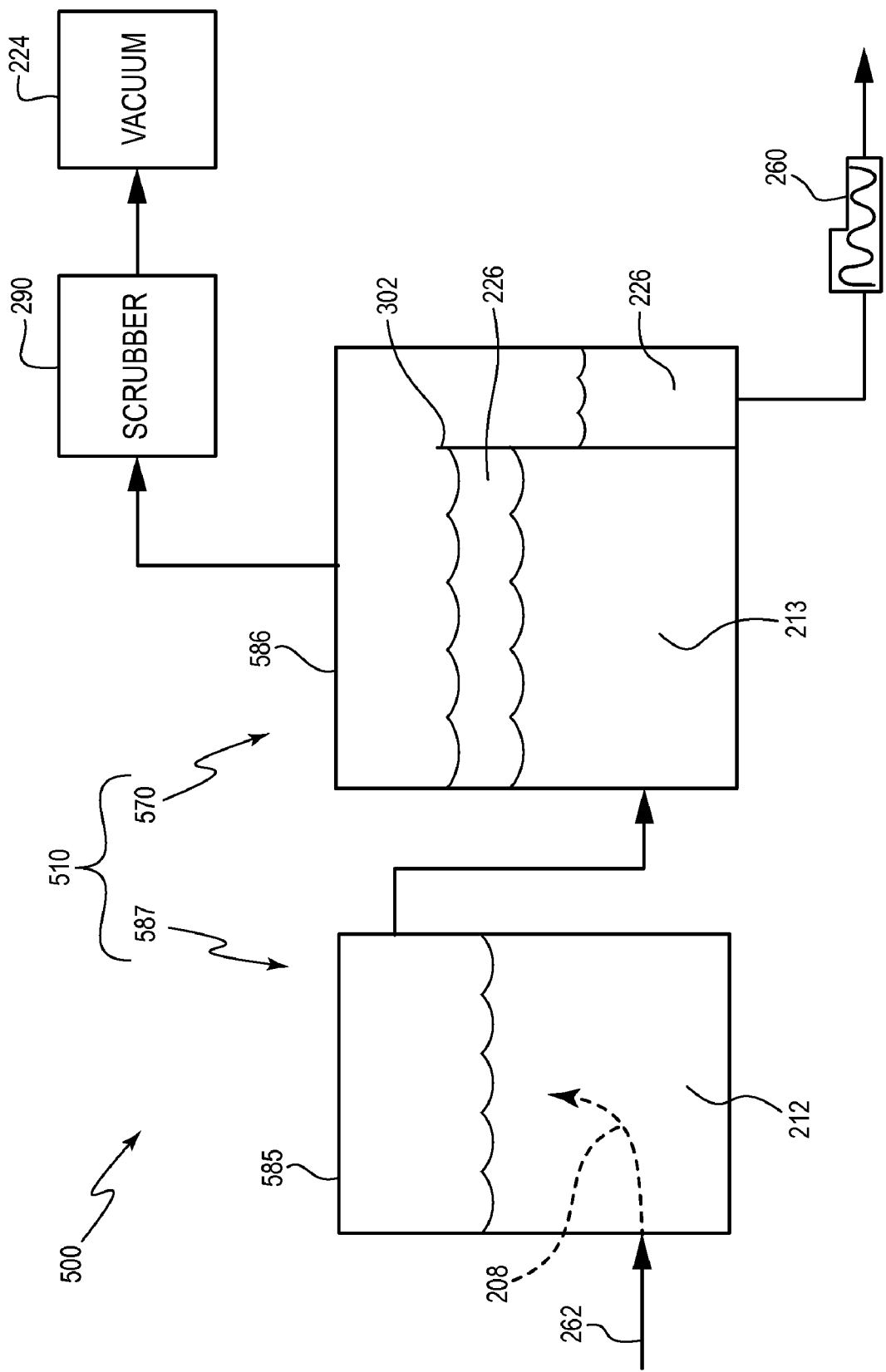
FIG. 9 is a schematic flow diagram of a cleaning system and a reservoir that can be used in another embodiment of a plastic recycling system such as the recycling system of FIG. 3.

FIG. 9 illustrates a portion of another embodiment of a plastic recycling system 500, which can be used in such plastic recycling systems as those described with respect to FIGS. 3, 7, and 8 (e.g., the recycling systems 200, 200, 400). Accordingly, like features are identified with like reference numerals. The system 500 includes a vapor treatment system 510 that includes a washing system or cleaning system 587 and a condenser 570. The cleaning system 587 includes a cleaning tank 585 that has a quantity of the pH adjusted solution 212 therein. The condenser 570 includes a reservoir 586 that resembles the reservoir 286 described above and contains a condensing liquid 213.

A vapor 208 can be introduced into the cleaning system 587 from a gas transfer line 262. The vapor 208 is placed into direct contact with the pH adjusted solution 212 within the cleaning tank 585. For example the vapor 208 can be bubbled through the pH adjusted solution 212. In this process, impurities may absorbed from the vapor 208 so as to be extracted therefrom. The solution 212 may be held at a temperature that is sufficiently high to prevent organic molecules from condensing therein.

After having been bubbled through the solution 212, the remaining vapor 208 can be removed from the cleaning tank 585 and delivered into the reservoir 586. The condensing liquid 213 can be maintained at a relatively low temperature and can be capable of condensing organic molecules from the vapor 208. The vapor 208 thus can be bubbled through the condensing liquid 213, and condensed organic molecules can collect above the condensing liquid 213 as a crude oil emulsion 226. Non-condensable gases can be drawn from the reservoir 286 through a caustic scrubber 290 via a vacuum system 224. Emulsion 226 that has spilled over a weir 302 can be drawn from the reservoir via a pump 260 for delivery to a settling tank 228 (see FIG. 3) for further separation.

The condensing liquid 213 can be maintained at a temperature that is lower than that of the pH adjusted solution 212. In some embodiments, a composition of the condensing liquid 213 and the pH adjusted solution 212 are the same (e.g., the condensing liquid 213 comprises a quantity of the pH adjusted solution 212). However, in other embodiments, the condensing liquid 213 may have a different composition. For example, the condensing liquid 213 may comprise neutral water.

It will be understood by those having skill in the art that changes may be made to the details of the above-described embodiments without departing from the underlying principles presented herein. For example, any suitable combination of various embodiments, or the features thereof, is contemplated. For example, various embodiments may be configured to operate in one or more of a batch mode, a continuous batch mode, or a continuous mode. Other or further embodiments may include a condenser system and/or other components (e.g., a container) that are configured to operate under one or more of vacuum conditions, atmospheric pressure conditions, or positive pressure conditions.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

The claims following this Detailed Description are hereby expressly incorporated into this Detailed Description, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Elements specifically recited in means-plus-function format, if any, are intended to be construed in accordance with 35 U.S.C. §112 ¶ 6. Embodiments of the invention in which an exclusive property or privilege is claimed are defined as follows.

The invention claimed is:

1. A method of recycling plastic, the method comprising:
heating a container that has a plastic feedstock therein so as to effect depolymerization of the plastic feedstock;
removing a vapor from the heated container, wherein the vapor comprises a gaseous organic species and a gaseous inorganic species;
condensing the gaseous organic species and separating the condensed organic species from the inorganic species by directly contacting the vapor with a pH adjusted solution,
wherein the condensed organic species is less dense than water and is hydrophobic, wherein separating the condensed organic species from the inorganic species comprises retaining the condensed organic species and the pH adjusted solution into which the inorganic species has been absorbed in a common tank, and wherein directly contacting the vapor with the pH adjusted solution causes absorption of the inorganic species into the solution;

introducing at least a portion of the condensed organic species that has been separated from the inorganic species into a settling tank to permit further additional pH adjusted solution to be separated from the condensed organic species; and returning pH adjusted solution that has separated from the condensed organic species back to the tank.

2. The method of claim 1, wherein the organic species comprises a class of polar organic molecules.

3. The method of claim 1, further comprising:
removing additional vapor from additional containers in a continuous batch mode, wherein the additional vapor comprises a gaseous organic species and a gaseous inorganic species; and
condensing the gaseous organic species of the additional vapor and separating the condensed organic species of the additional vapor from the inorganic species of the additional vapor by directly contacting the additional vapor with the pH adjusted solution.

4. The method of claim 1, wherein heating the container comprises providing heated air to an exterior of the container at a steady temperature during a transition of a plurality of molecular species from the plastic feedstock into the vapor, wherein each of the plurality of molecular species has a different vaporization temperature at a given pressure.

5. A method of recycling plastic, the method comprising:
heating a plastic feedstock under negative pressure so as to effect depolymerization of the plastic feedstock and so as to produce a vapor that comprises a first component and a second component, wherein the first component comprises a gaseous organic species and the second component comprises one or more of an atomic species and a molecular species;
condensing the gaseous organic species and separating the condensed organic species from the second component by directly contacting the vapor with a pH adjusted solution.

6. The method of claim 5, wherein at least a portion of the second component of the vapor is in a gaseous state before the vapor is directly contacted with the pH adjusted solution.

7. The method of claim 6, wherein directly contacting the vapor with a pH adjusted solution condenses at least a portion of the second component.

8. The method of claim 5, wherein the second component of the vapor comprises one or more of a metal species, a polar organic species, an organic acid species, and inorganic acid species.

9. The method of claim 5, wherein the organic species of the first component of the vapor comprises one or more species of non-polar organic molecules.

10. The method of claim 5, wherein directly contacting the vapor with the pH adjusted solution causes absorption of at least a portion of the second component into the solution, wherein the condensed organic species of the first component is less dense than water and is hydrophobic, and wherein separating the condensed organic species from the second component comprises retaining the condensed organic species and the pH adjusted solution into which at least a portion of the second component has been absorbed in a common reservoir.

11. The method of claim 10, wherein separating the condensed organic species from the second component further comprises permitting at least a portion of the condensed organic species to flow over an upper edge of the reservoir while retaining the pH adjusted solution into which at least a portion of the second component has been absorbed within a separate region of the reservoir.

12. The method of claim 5, wherein said directly contacting the vapor with a pH adjusted solution comprises bubbling the vapor through the pH adjusted solution.

13. The method of claim 5, wherein said directly contacting the vapor with a pH adjusted solution comprises spraying the vapor with the pH adjusted solution.

14. The method of claim 13, wherein directly contacting the vapor with the pH adjusted solution causes absorption of at least a portion of the second component into the solution, wherein the condensed organic species is less dense than water and is hydrophobic, and wherein separating the condensed organic species from the second component comprises retaining the condensed organic species and the pH adjusted solution into which at least a portion of the second component has been absorbed in a common reservoir, the method further comprising spraying additional vapor obtained from the plastic feedstock with the pH adjusted solution into which the second species has been absorbed.

15. A method of recycling plastic, the method comprising:
heating a plastic feedstock under negative pressure so as to effect depolymerization of the plastic feedstock and so as to produce a vapor that comprises a first component and a second component, wherein the first component comprises a gaseous organic species and the second component comprises one or more of an atomic species and a molecular species; and
condensing the first component of the vapor and separating at least a portion of the second component from the first component by directly contacting the vapor with a pH adjusted solution at a first temperature, wherein condensing the first component results in a condensed organic species and separation of the first component from the second component, and wherein the separation of the first component from the second component occurs as the second component is absorbed into the pH adjusted solution.

16. The method of claim 15, further comprising separating the condensed organic species from the second component absorbed into the pH adjusted solution after having condensed the first component of the vapor.

17. The method of claim 15, wherein the condensed organic species and a portion of the pH adjusted solution into which at least a portion of the second component of the vapor has been absorbed are included together in an emulsion; the method further comprising separating the condensed organic species from the pH adjusted solution.

18. The method of claim 15, wherein directly contacting the vapor with a pH adjusted solution comprises spraying the vapor.

19. A method of recycling plastic, the method comprising:
heating a plastic feedstock under negative pressure so as to effect depolymerization of the plastic feedstock and so as to produce a vapor that comprises a first component and a second component, wherein the first component comprises a gaseous organic species and the second component comprises one or more of an atomic species and a molecular species;
absorbing at least a portion of the second component of the vapor by directly contacting the vapor with a pH adjusted solution at a first temperature; and
condensing the first component of the vapor to form a condensed organic species by directly contacting the vapor with a condensing liquid at a second temperature.

20. The method of claim 19, wherein a composition of the pH adjusted solution and a composition of the condensing liquid are the same.

21. The method of claim 19, wherein the condensed first component of the vapor and the condensing liquid are included together in an emulsion; the method further comprising separating the condensed organic species from the condensing liquid.

22. A method of recycling plastic, the method comprising:
introducing a first cartridge that contains a first quantity of plastic feedstock into a first heating plenum;
introducing a second cartridge that contains a second quantity of plastic feedstock into a second heating plenum;
heating both the first and second cartridges such that the first quantity of plastic feedstock yields a first vapor and the second quantity of plastic feedstock yields a second vapor;
introducing the first and second vapors into a vapor treatment system; and
condensing the first and second vapors by simultaneously contacting the first and second vapors with a pH adjusted solution.

23. The method of claim 22, further comprising combining at least a portion of the first and second vapors within a gas transfer line prior to introducing the first and second vapors into the vapor treatment system.

24. The method of claim 22, wherein heating both the first and second cartridges comprises providing heated fluid to the first heating plenum from a first burner and providing heated fluid to the second heating plenum from a second burner that is independent of the first burner.

25. The method of claim 24, further comprising:
removing the first cartridge from the first heating plenum;
introducing a third cartridge that contains a third quantity of plastic feedstock into the first heating plenum; and
heating the third cartridge such that the third quantity of plastic feedstock yields a third vapor.

26. The method of claim 25, further comprising combining at least a portion of the third vapor and at least a portion of the second vapor within a gas transfer line; and
introducing the combined portions of the third and second vapors into the vapor treatment system.

27. The method of claim 25, further comprising maintaining operation of the second burner so as to heat the second container while removing the first cartridge from the first heating plenum and while introducing the third cartridge into the first heating plenum.

28. The method of claim 22, wherein condensing the first and second vapors by simultaneously contacting the first and second vapors with a pH adjusted solution takes place after the first and second vapors have been introduced into the vapor treatment system.

29. A plastic recycling system comprising:
a sealable container having a plastic feedstock therein, the container comprising a port;
a heating system configured to receive the container and to apply heat thereto in an amount sufficient to result in depolymerization of the plastic feedstock;
a gas transfer system coupled with the port of the container so as to remove vapor from the container through the port and into the gas transfer system; and
a vapor treatment system in fluid communication with the gas transfer system, the vapor treatment system comprising a condenser utilizing a pH adjusted solution, wherein the condenser is configured to condense an organic molecular species from the vapor by effecting direct contact between the pH adjusted solution and vapor that is received into the vapor treatment system from the gas transfer system.

30. The system of claim 29, wherein the vapor treatment system further comprises a reservoir that contains at least a portion of the pH adjusted solution, wherein the reservoir is configured to receive the condensed organic molecular species.

31. The system of claim 30, wherein the reservoir comprises a weir such that at least a portion of the condensed organic molecular species can flow over an edge of the weir so as to be separated from the pH adjusted solution.

32. The system of claim 29, wherein the vapor treatment system comprises a first sprayer that is configured to spray the vapor with the pH adjusted solution at a first temperature.

33. The system of claim 32, wherein the vapor treatment system further comprises a second sprayer that is configured to spray the vapor with the pH adjusted solution at a second temperature, wherein the first temperature is higher than the second temperature.

34. The system of claim 33, wherein the first sprayer is positioned lower than the second sprayer such that a portion of the vapor rises toward the second sprayer after having been sprayed by the first sprayer.

35. The system of claim 29, further comprising a cooling system configured to maintain the pH adjusted solution that is used for direct contact with the vapor at a temperature lower than that of the vapor.

36. The system of claim 29, further comprising a vacuum system that is in fluid communication with the container when the container is sealed and is configured to maintain negative pressure within the container during heating thereof.

37. The system of claim 36, wherein the vacuum system is in fluid communication with the vapor treatment system and the gas transfer system and is configured to maintain negative pressure within the vapor treatment system and the gas transfer system during operation of the plastic recycling system.

38. The system of claim 29, further comprising:
a control system; and
one or more of a temperature sensor and a pressure sensor in communication with the control system and positioned to obtain measurements of the vapor,
wherein the control system is configured to adjust or terminate an amount of heat delivered to the container by the heating system in response to the measurements.

39. The system of claim 29, further comprising a settling tank and a pump that is in fluid communication with the vapor treatment system, wherein the pump is configured to transport at least a portion of the condensed organic molecular species to the settling tank.

40. The system of claim 29, further comprising an environmental control device, wherein non-condensable components of the vapor are delivered from the condenser system to the environmental control device.

41. The system of claim 40, wherein the environmental control device provides heated exhaust to a portion of the heating system.

* * * * *